(12) United States Patent
Lee et al.

(10) Patent No.: US 12,530,490 B2
(45) Date of Patent: Jan. 20, 2026

(54) PERSONAL INFORMATION MANAGEMENT SERVER AND METHOD FOR OPERATING SAME

(71) Applicant: SNPLAB INC., Seoul (KR)

(72) Inventors: Jaeyoung Lee, Seoul (KR); Changki Jeong, Seoul (KR); Kyusik Yoon, Seoul (KR); Jaegu Kim, Seoul (KR)

(73) Assignee: SNPLAB INC., Seoul (KR)

( * ) Notice: Subject to any disclaimer, the term of this patent is extended or adjusted under 35 U.S.C. 154(b) by 83 days.

(21) Appl. No.: 18/289,105

(22) PCT Filed: Jun. 15, 2022

(86) PCT No.: PCT/KR2022/008495
§ 371 (c)(1),
(2) Date: Oct. 31, 2023

(87) PCT Pub. No.: WO2022/265404
PCT Pub. Date: Dec. 22, 2022

(65) Prior Publication Data
US 2024/0211626 A1  Jun. 27, 2024

(30) Foreign Application Priority Data
Jun. 15, 2021 (KR) ..................... 10-2021-0077731

(51) Int. Cl.
*G06F 21/62* (2013.01)
*G06F 21/64* (2013.01)

(52) U.S. Cl.
CPC .......... *G06F 21/6245* (2013.01); *G06F 21/64* (2013.01)

(58) Field of Classification Search
None
See application file for complete search history.

(56) References Cited

U.S. PATENT DOCUMENTS 11,301,582 B2    4/2022  Lee
2018/0255097 A1  9/2018  Li et al.
(Continued)

FOREIGN PATENT DOCUMENTS

KR  10-2010-0104276 A   9/2010
KR  10-2015-0144070 A  12/2015
(Continued)

OTHER PUBLICATIONS

KR Office Action dated Apr. 16, 2024 as received in Application No. 10-2022-0072975.

*Primary Examiner* — Brandon Hoffman
(74) *Attorney, Agent, or Firm* — Maschoff Brennan

(57) ABSTRACT

A personal information management server comprises: a communication circuit configured to transmit/receive data to/from an external device; memory configured to store data required for operating the management server; and a processor configured to perform a plurality of operations in response to the execution of instructions stored in the memory. The plurality of operations performed by the processor include: receiving target event information from a request terminal; determining a target property associated with a target event among properties of the personal information; transmitting a personal information collection request for collecting the personal information corresponding to the target property from a user terminal; receiving the personal information corresponding to the target property from the user terminal; generating target information for predicting the occurrence of the target event by using the personal information corresponding to the target property; and transmitting the determined target information to the request terminal.

15 Claims, 7 Drawing Sheets

(56) References Cited

U.S. PATENT DOCUMENTS

| | | | |
|---|---|---|---|
| 2020/0175554 A1* | 6/2020 | Vukich | H04L 9/3239 |
| 2020/0364358 A1* | 11/2020 | Karia | G06F 21/6218 |
| 2021/0365867 A1* | 11/2021 | Kim | G06Q 10/06398 |
| 2022/0094544 A1* | 3/2022 | Sekar | G06Q 10/10 |
| 2022/0150073 A1* | 5/2022 | Androulaki | G16H 10/60 |

FOREIGN PATENT DOCUMENTS

| | | |
|---|---|---|
| KR | 10-2018-0053156 A | 5/2018 |
| KR | 10-2019-0122538 A | 10/2019 |
| KR | 10-2020-0030345 A | 3/2020 |
| KR | 10-2021-0039190 A | 4/2021 |
| KR | 10-2257403 B1 | 5/2021 |

* cited by examiner

[FIG. 1]
[FIG. 2]
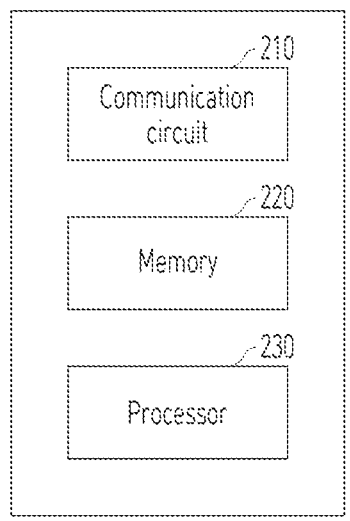

[FIG. 3]
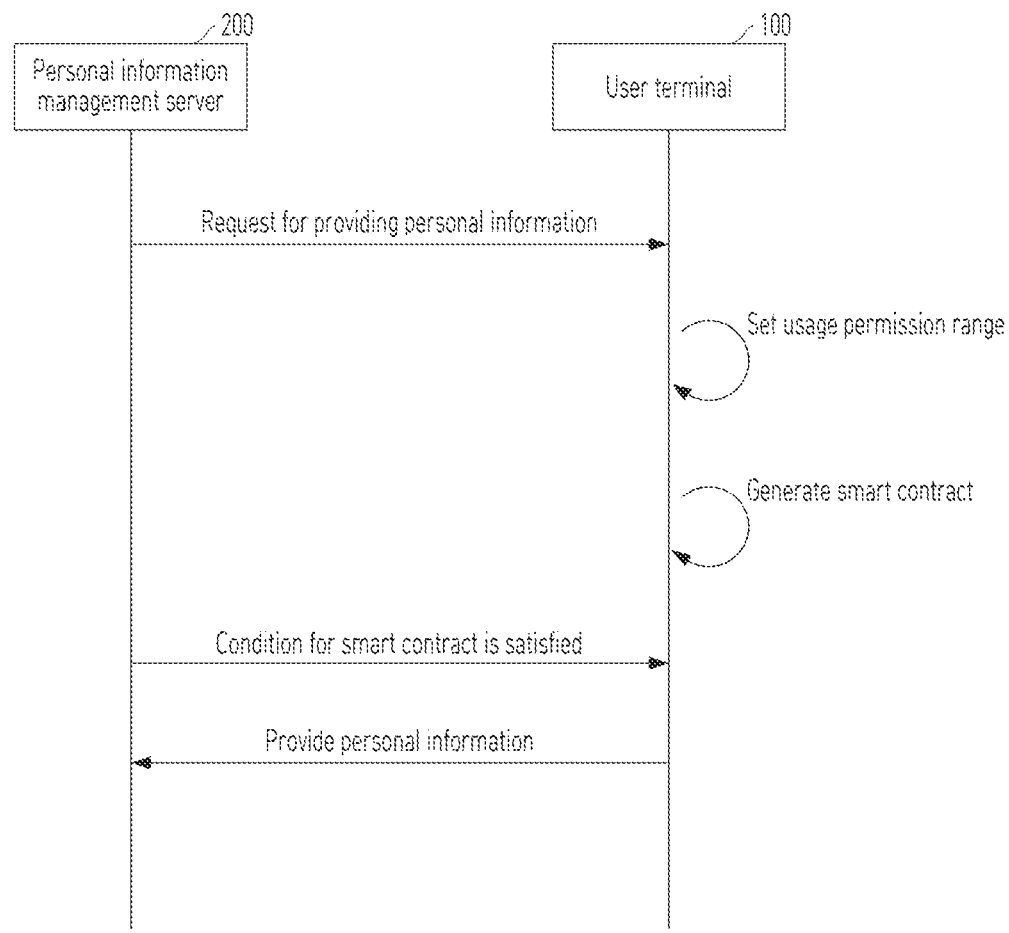
[FIG. 4]
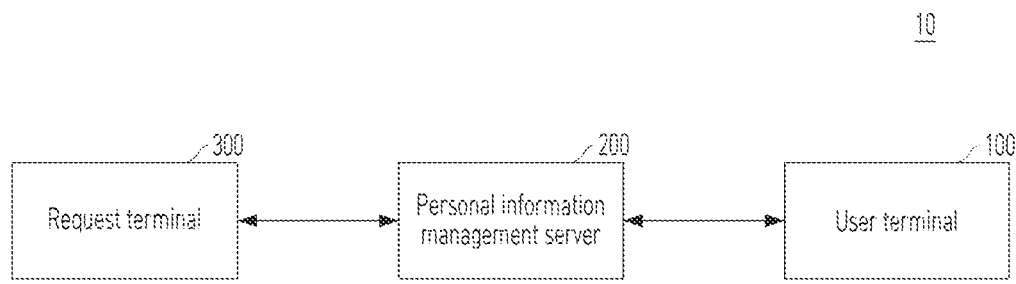

[FIG. 5]
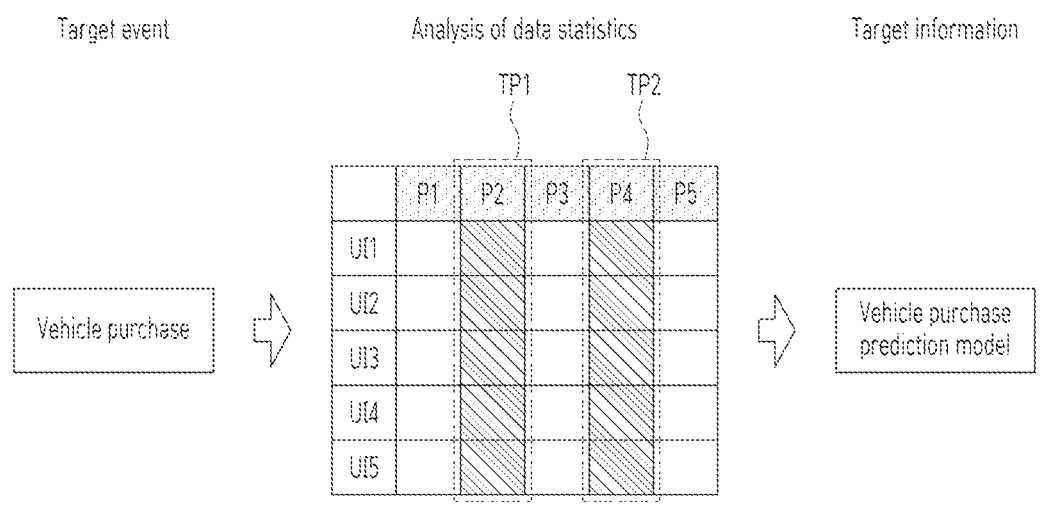

[FIG. 6]
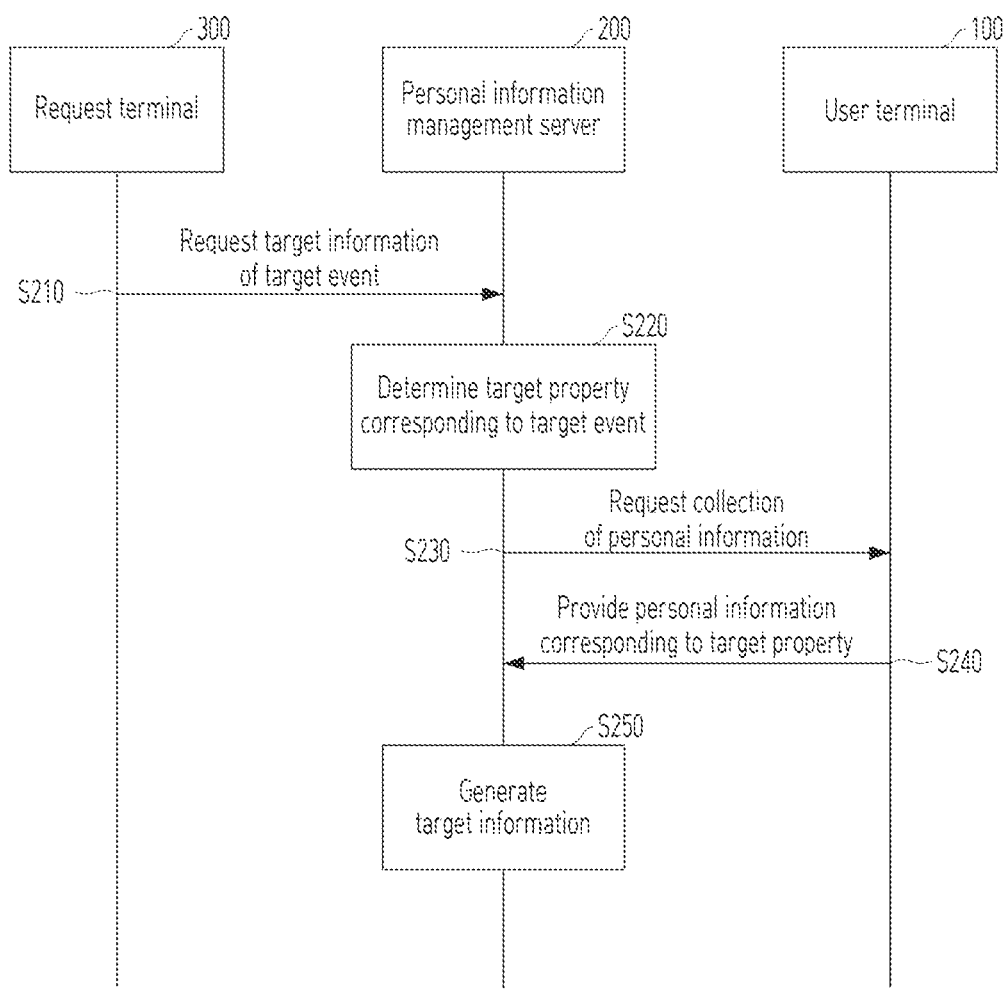

[FIG. 7]
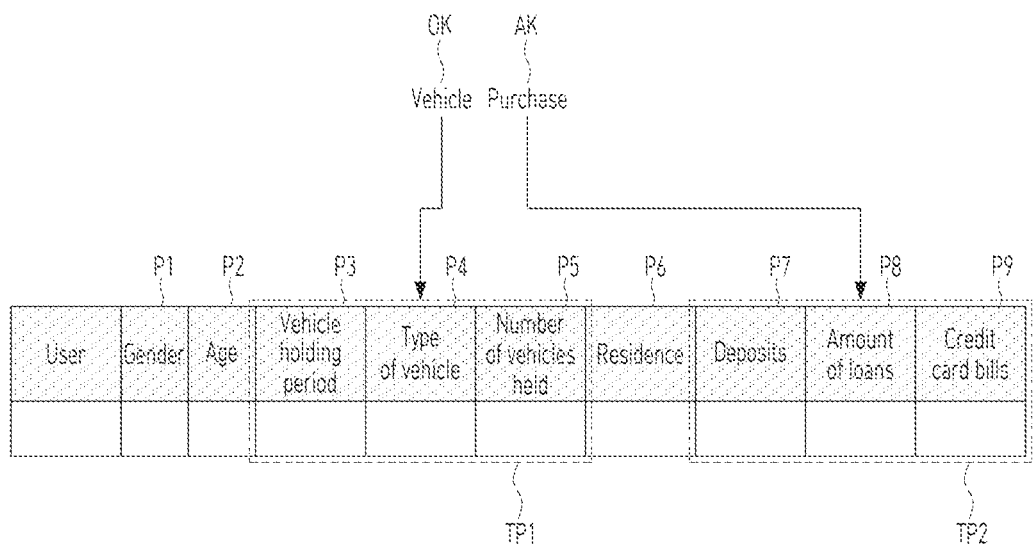

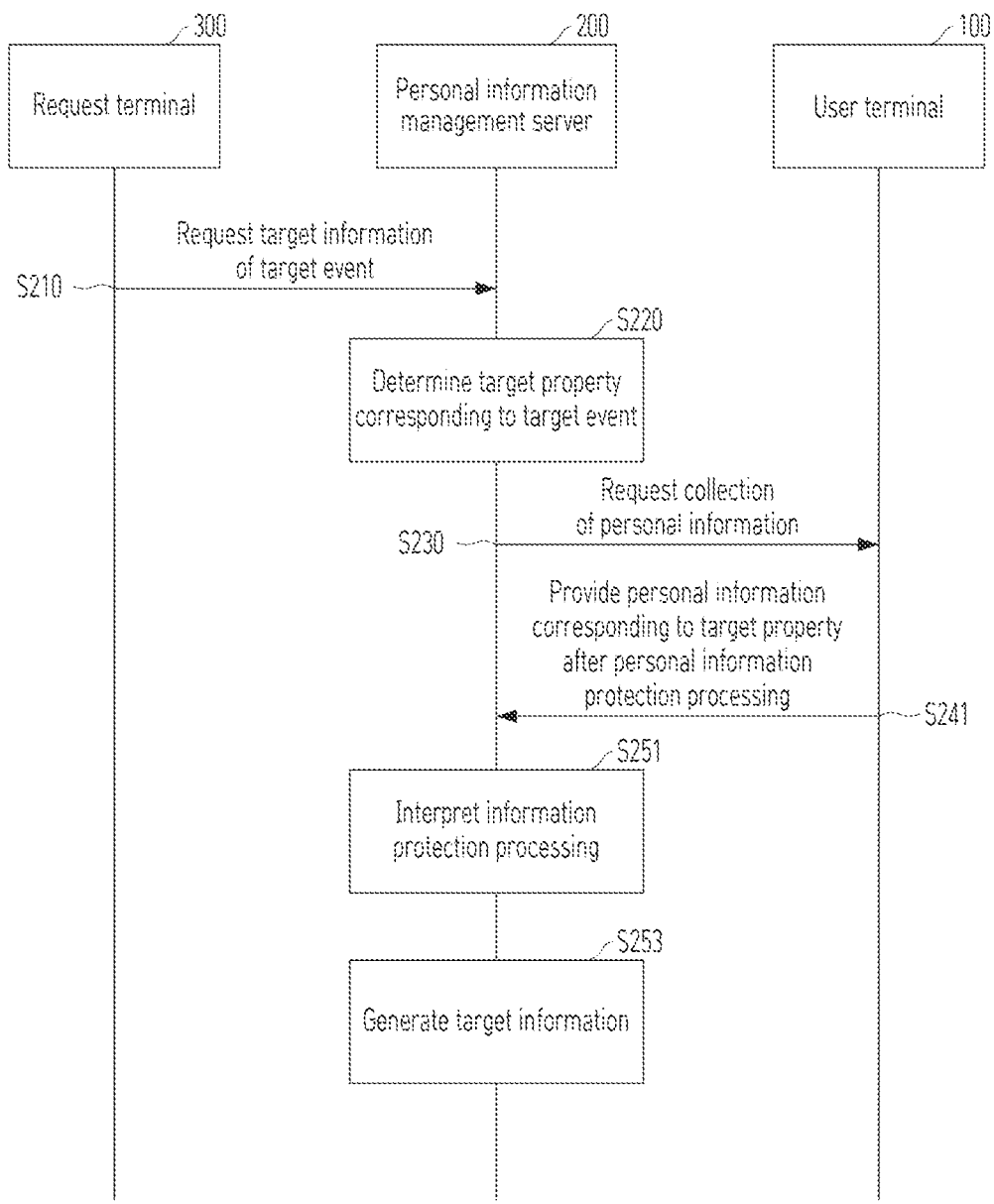
[FIG. 8]

[FIG. 9]
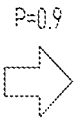

PERSONAL INFORMATION MANAGEMENT SERVER AND METHOD FOR OPERATING SAME

TECHNICAL FIELD

Embodiments of the present disclosure relate to a personal information management server and an operating method thereof.

BACKGROUND ART

Recently, a MyData technology, that refers to a series of processes in which an individual, who is an information subject, actively manages and controls his or her information and actively uses the information in his or her private life up to credit management, asset management, and health management, has been in the spotlight. A conventional MyData technology has a structure in which a service provider stores and uses personal information of a user, and has a problem in that a large amount of personal information is exposed to a hacking danger. Furthermore, there is a problem in that the personal information of the user that is stored by the provider has low utilization because there is a poor possibility that the personal information stored by the provider will be the latest personal information.

The contents described in the Background Art are to help the understanding of the background of the disclosure, and may include contents that are not a disclosed conventional technology.

DISCLOSURE

Technical Problem

An object of the present disclosure is to provide a personal information management server capable of generating target information for predicting the occurrence of a target event from personal information of a user.

Technical Solution

A personal information management server configured to manage personal information of a user according to embodiments of the present disclosure includes a communication circuit configured to exchange data with an external device, memory configured to store data necessary for an operation of the management server, and a processor configured to perform a plurality of operations in response to an execution of instructions stored in the memory. The plurality of operations being performed by the processor includes receiving target event information from a request terminal, determining a target property associated with the target event, among properties of the personal information, transmitting a personal information collection request for collecting personal information corresponding to the target property from a user terminal, receiving the personal information corresponding to the target property from the user terminal, generating target information for predicting an occurrence of the target event by using the personal information corresponding to the target property, and transmitting determined target information to the request terminal.

An operating method of a personal information management server configured to manage personal information of a user according to embodiments of the present disclosure includes receiving target event information from a request terminal, determining a target property associated with the target event, among properties of the personal information, transmitting a personal information collection request for collecting personal information corresponding to the target property from a user terminal, receiving the personal information corresponding to the target property from the user terminal, generating target information for predicting an occurrence of the target event by using the personal information corresponding to the target property, and transmitting determined target information to the request terminal.

Advantageous Effects

According to embodiments of the present disclosure, there is an effect in that a marketing strategy related to a target event can be easily planned by using target information because the target information for predicting the occurrence of a target event can be generated from personal information of a user.

According to embodiments of the present disclosure, there are effects in that since related target properties, among several properties of personal information of a user, are used when target information for predicting the occurrence of a target event is generated, the user can minimize a danger that all of pieces of his or her personal information may be exposed and can provide only personal information that is desired to be provided by the user and the personal information management server can be provided with only personal information that is necessary to generate target information.

DESCRIPTION OF DRAWINGS

FIG. 1 illustrates a personal information management system according to embodiments of the present disclosure.

FIG. 2 illustrates a personal information management server according to embodiments of the present disclosure.

FIG. 3 is a diagram for describing an operation of the personal information management system according to embodiments of the present disclosure.

FIG. 4 illustrates a personal information management system according to embodiments of the present disclosure.

FIG. 5 is a diagram for describing an operation of the personal information management server according to embodiments of the present disclosure.

FIG. 6 is a diagram for describing an operation of the personal information management system according to embodiments of the present disclosure.

FIG. 7 is a diagram for describing that target properties according to embodiments of the present disclosure are determined.

FIG. 8 is a diagram for describing the collection of personal information according to embodiments of the present disclosure.

FIG. 9 is a diagram for describing an information protection processing process according to embodiments of the present disclosure.

MODE FOR INVENTION

Hereinafter, preferred embodiments of the present disclosure are described in detail with reference to the accompanying drawings.

Embodiments are provided to more fully explain the present disclosure to a person having ordinary knowledge in the art to which the present disclosure pertains. The following embodiments may be modified in various other forms, and the scope of the present disclosure is not limited to the following embodiments. Rather, these embodiments are provided to make the present disclosure more thorough and complete and to fully convey the spirit of the present disclosure.

Terms used in this specification are used to describe a specific embodiment, and are not intended to limit the present disclosure. Furthermore, in this specification, an expression of the singular number may include an expression of the plural number unless clearly defined otherwise in the context.

In the description of the embodiments, when it is described that each layer (film), area, pattern, or structure is formed "on" or "under" each substrate, layer (film), area, pad, or pattern, this includes both expressions, including that a layer is formed on another layer "directly" or "with a third layer interposed between the two layers (indirectly)". Furthermore, a criterion for the term "on or under of each layer" is described based on the drawings.

The drawings are merely for enabling the spirit of the present disclosure to be understood, and it should not be interpreted that the scope of the present disclosure is limited by the drawings. Furthermore, in the drawings, a relative thickness or length or a relative size may be enlarged for convenience and the clarity of description.

FIG. 1 illustrates a personal information management system according to embodiments of the present disclosure. Referring to FIG. 1, the personal information management system 10 according to embodiments of the present disclosure may include a user terminal 100 and a personal information management server 200. In this case, the user terminal 100 may be plural.

The system 10 according to embodiments of the present disclosure may preferentially store personal information of a user in the user terminal 100 so that the user can have control of his or her personal information, and allows the personal information of the user stored in the user terminal 100 to be provided to the outside only when the user permits a request from the outside (e.g., the personal information management server 200) when receiving the request.

The user terminal 100 is a mobile device of a user, and may exchange data with the personal information management server 200. The user terminal 100 may store the personal information of the user. According to embodiments, the user terminal 100 may store the "latest" personal information of the user. The personal information of the user is recorded and stored in an external server (e.g., a card company server) in real time. Unlike in a conventional technology in which a user downloads his or her personal information from the external server and uses the personal information, the user terminal 100 according to embodiments of the present disclosure may store the latest personal information of the user.

In this case, the personal information includes identification information (e.g., a resident registration number, a phone number, an e-mail address, a date of birth, and an address) capable of identifying (or specifying) a user directly and indirectly and de-identification information (a record of search words, a user terminal usage history, income information, and a shopping history) incapable of identifying a user.

The user terminal 100 is a device capable of data communication, and may be, for example, a smartphone, a notebook, a computer, a wearable device, etc., but embodiments of the present disclosure are not limited thereto. According to embodiments, the user terminal 100 may execute an application capable of recording and storing the personal information of the user, may record the personal information of the user in response to the execution of the application, and may store the recorded personal information. In this case, the recording of the personal information of the user may be directly performed by the user or may be indirectly performed based on a usage record of the user terminal 100 of the user. The user terminal 100 may encrypt and store the personal information of the user, and may display or output the encrypted personal information through a predetermined authentication process.

According to embodiments, the user terminal 100 may set a de-identification level of the stored personal information, and may process the stored personal information based on the set de-identification level. For example, when the user sets the de-identification level as a reference level or higher, the user terminal 100 may delete or mask at least some of the identification information included in the personal information. For example, the user terminal 100 may delete or mask the resident registration number included in the personal information of the user. The user terminal 100 may provide the de-identified personal information to the personal information management server 200.

The user terminal 100 may set the de-identification level according to various criteria, such as for each period, for each number of personal information provided, etc.

The personal information management server 200 may manage personal information of users. According to embodiments, the personal information management server 200 may receive personal information of a user from the user terminal 100 of the user. In this case, the personal information management server 200 may provide the received personal information of the user to the outside, and may pay the user for the provision of the personal information.

Furthermore, alternately, the personal information management server 200 may read the personal information of the user stored in the user terminal 100. In this case, the "read" means an operation of confirming corresponding personal information through the personal information management server 200 in the state in which the personal information stored in the user terminal 100 has not leaked to the personal information management server 200.

The personal information management server 200 may request the reading (or provision) of the personal information from the user terminal 100 of the user. According to embodiments of the present disclosure, in principle, the personal information of the user that is read and stored by the personal information management server 200 is personal information that is provided based on the user's permission (or approval). That is, the subject who manages the personal information is the user, that is, the user terminal 100.

FIG. 2 illustrates the personal information management server according to embodiments of the present disclosure. Referring to FIG. 2, the personal information management server 200 may include a communication circuit 210, memory 220, and a processor 230.

The communication circuit 210 may exchange data with an external device. According to embodiments, the communication circuit 210 may receive data from the user terminal 100 or may transmit data to the user terminal 100. For example, the communication circuit 210 may exchange data according to a wired communication protocol or a wireless communication protocol.

The memory 220 may store data necessary for an operation of the personal information management server 200. According to embodiments, the memory 220 may store a program (i.e., a personal information management application) including a plurality of instructions for performing a personal information management operation that is performed by the personal information management server 200. Furthermore, the memory 220 may store the personal information of the user that is transmitted by the user terminal 100.

The processor 230 may control an overall operation of the personal information management server 200. According to embodiments, the processor 230 may have an operational processing function, may execute the personal information management application stored in the memory 220, and may perform a plurality of operations based on instructions included in the personal information management application. For example, the processor 230 may perform the plurality of operations by controlling the communication circuit 210 and the memory 220.

According to embodiments, some functions of the processor 230 may be separated, and may be implemented as a part of the communication circuit 210 and/or memory 220 of the personal information management server 200 additionally or alternately.

FIG. 3 is a diagram for describing an operation of the personal information management system according to embodiments of the present disclosure. Referring to FIG. 3, the user terminal 100 may set a usage permission range for the personal information of the user. The personal information management server 200 may use and manage the personal information of the user, which is received from the user terminal 100, based on the set usage permission range. In this case, the usage permission range may include a category of the personal information, information on an external subject to which the personal information will be provided, the de-identification level of the personal information, etc.

According to embodiments, the user terminal 100 generates a smart contract having the usage permission range of the personal information as a condition. The generated smart contract is transmitted to the personal information management server 200. The personal information management server 200 may use and manage the personal information of the user within a range in which the set usage permission range is satisfied according to the smart contract. The smart contract is a bundle of promises that have been materialized in a digital form. The persons directly involved may define that the smart contract includes a protocol that performs an act of performance based on the promises. A contract condition and/or the act of performance may be coded in a digital form and embedded in hardware or software. When conditions included in the smart contract are satisfied, a code of the smart contract may be executed, so that the smart contract can be performed. For example, the smart contract may be implemented over a blockchain network, but embodiments of the present disclosure are not limited thereto.

The blockchain is an innovative concept in which the integrity and reliability of transaction information can be guaranteed without a trusted third party, and refers to a digital distributed ledger—digitized and stored in a unit called a "block"—in which the same ledger copy is stored in multiple computers. The "block" is divided into a body and a header. Transaction contents are stored in the body. An encryption code, etc. are stored in the header. The "block" is distributed and stored in computers (nodes) of blockchain network participants. When a new transaction occurs or the existing transaction is changed, a new block is generated and connected to the existing block in a temporal order. Such connections are connected like a chain.

An operation structure of the distributed ledger is determined, automated, and operated by a predetermined consensus algorithm. All network participants store all ledgers, respectively, and perform a task of updating the ledgers by incorporating a new transaction in common. Accordingly, although transaction information within blocks stored in some participants are damaged or forged, the corresponding information is present in the remaining blocks in its entirety. Since such a fact can be easily confirmed and restored, data that have been confirmed to be stored in a block by the consensus algorithm are permanently stored, and the falsification and modification of the data are impossible. In principle, the data have high transparency because all participants can access the data and the tracking of transactions of the data is easy. Accordingly, in managing personal information according to various embodiments of the present disclosure by using a distributed ledger that is managed by each blockchain node, both an individual and an information user (basically a company) as an information provider can safely participate in personal information transactions.

The personal information management server 200 may transmit a request to request the provision or reading of the personal information to the user terminal 100 (S110). According to embodiments, the personal information management server 200 may request the usage (i.e., provision or reading) of the personal information periodically or according to a specific condition.

The user terminal 100 may set a usage permission range of the personal information corresponding to the request in response to the request (S120). According to embodiments, the user terminal 100 may set the usage permission range of the personal information based on an input from the user. Meanwhile, alternatively, the user terminal 100 may set the usage permission range of the personal information in advance although a usage request for the personal information from the personal information management server 200 is not present.

The user terminal 100 may generate a smart contract corresponding to the set usage permission range (S130). The smart contract may be implemented over a blockchain network. According to embodiments, the user terminal 100 may generate the smart contract by recording the contents of the smart contract including the usage permission range of the set personal information on the blockchain network.

According to embodiments, the smart contract may be a program code that is executed when a specific condition is satisfied. For example, the user terminal 100 may generate the smart contract that operates when the set usage permission range of the personal information is satisfied, and may record the generated smart contract on the blockchain network. The generation of the smart contract and recording of the smart contract on the blockchain network 300 by the user terminal 100 may be called an expression of intention of subscription.

According to embodiments, the user terminal 100 may generate one or more smart contracts for one piece of personal information. That is, a usage permission range, etc. may be differently set with respect to the same personal information.

The personal information management server 200 may satisfy a condition for the smart contract (S140). According to embodiments, the personal information management server 200 may transmit an expression of intention of approval for the smart contract, which indicates the satisfaction of the usage permission range recorded on the smart contract, over a blockchain network. The expression of intention of approval may be provided to the blockchain network or the user terminal 100.

The personal information management server 200 may receive the personal information as the smart contract is satisfied (S150). According to embodiments, as the usage permission range included in the smart contract is satisfied, the personal information management server 200 may use the personal information of the user.

According to embodiments, the personal information management server 200 may transmit, to the blockchain network, the expression of intention of approval that satisfies the usage permission range included in the smart contract. The blockchain network may transmit the personal information to the personal information management server 200 so that the personal information is suitable for the usage permission range, in response to the expression of intention of approval.

Alternately, according to embodiments, the personal information management server 200 may transmit, to the user terminal 100, the expression of intention of approval that satisfies the usage permission range included in the smart contract over the blockchain network. The user terminal 100 may transmit the personal information to the personal information management server 200 so that the personal information is suitable for the usage permission range, in response to the expression of intention of approval.

Meanwhile, the smart contract for using the personal information according to embodiments of the present disclosure may be understood as personal information usage rights. The personal information usage rights are rights capable of using the personal information of the user, and are assigned by the user and obtained by an external user who wants to use the personal information. When the usage permission range of the user and a usage request from the external user are agreed, a contract to use the personal information may be considered to have been concluded. To use the personal information based on the agreed contents may be considered as the execution of the contract.

As described above, the transaction of the personal information usage rights is implemented based on the smart contract. A personal information usage condition as the conclusion condition for the smart contract may be generated based on the contents of the usage permission range of the user and/or the usage request for the personal information from the external user. In the personal information usage condition, when the conclusion condition for the smart contract is satisfied and the condition is satisfied, the contract is concluded, and the contents of the personal information are executed.

The personal information usage rights are issued by the user in response to a request from an external user or independently. The "issue" corresponds to the subscription of the contract, and means a state before the approval of the subscription is reached. The contract can be concluded and executed only when the issued personal information usage rights are approved. That is, the personal information can be used by presenting the personal information usage rights.

According to embodiments, the user terminal 100 issues the personal information usage rights (as digital data) included in the preset usage permission range (i.e., usage condition). The issued personal information usage rights may include a personal information category, a de-identification level and/or information on an external user, which may be used as a usage condition, for example. In another embodiment, the personal information category and the de-identification level as the usage condition have been presented, but everyone can use the personal information usage rights if there is no restriction on an external user. Contents, such as a usage period, a usage number, and a usage purpose may be added to the usage condition. According to embodiments, the usage condition for the personal information usage rights may be variously combined and displayed unless the usage condition deviates from the usage permission range of the user.

FIG. 4 illustrates a personal information management system according to embodiments of the present disclosure. Referring to FIG. 4, the personal information management system 10 includes a user terminal 100, a personal information management server 200, and a request terminal 300. The personal information management system 10, the user terminal 100, and the personal information management server 200 that perform the same roles as those described with reference to FIG. 1 are assigned the same reference numerals, and only an operation or function that has not been previously described is described.

Unlike the personal information management system 10 described with reference to FIG. 1, the personal information management system 10 described with reference to FIG. 3 further includes the request terminal 300 that requests target information for a target event. The request terminal 300 may request, from the personal information management server 200, target information associated with the occurrence of a specific event (the target event).

In this specification, target information is information for predicting the occurrence of a target event. For example, the target information may mean an algorithm for predicting the occurrence of the target event, personal information having high association with the occurrence of the target event, users having a high probability that the target event will occur, etc., but embodiments of the present disclosure are not limited thereto. For example, if a target event is "a vehicle purchase", target information may be "an algorithm for predicting the probability that a vehicle will be purchased", "a list of users having a high probability that the users will purchase a vehicle", "personal information having a high degree of association with the vehicle purchase", etc. but embodiments of the present disclosure are not limited to a detailed form of the target information.

The requester of the request terminal 300 may plan an effective marketing strategy related to the target event by using the target information. For example, the requester may be a company that plans the sales of a service/commodity through the prediction of demands for the service/commodity of a customer, such as an e-commerce, marketing, financial, or insurance company, but is not limited thereto.

The request terminal 300 may transmit, to the personal information management server 200, a target information request including information on the target event. According to embodiments, the request terminal 300 may receive a list of target events provided by the personal information management server 200, and may select at least one target event, among the target events included in the list. The selected contents may be transmitted to the personal information management server 200.

The personal information management server 200 may generate the target information for the target event by using personal information of a user. The personal information management server 200 according to embodiments of the present disclosure may manage personal information of a plurality of users. The personal information of the users may include various types of information (e.g., an account balance, gender, and a record of search words) of the users. The personal information management server 200 may generate the target information associated with the target event based on the personal information of the user. For example, the personal information management server 200 may generate an algorithm (or model) for predicting the probability that the target event "vehicle purchase" will occur by using the personal information of the user, and may provide the generated model to the request terminal 300.

For example, the personal information that is managed by the personal information management server 200 may include information on whether the target event has occurred. The personal information management server 200 may generate (i.e., determine) the target information for predicting the occurrence of the target event by using the corresponding information. That is, the personal information of the user may include information on a "prior probability". The personal information management server 200 may generate the target information that is necessary to predict a "post-probability" by using the personal information.

The user terminal 100 may provide the personal information management server 200 with the personal information of the user. According to embodiments, the user terminal 100 may provide the personal information management server 200 with the personal information that is necessary for the personal information management server 200 to generate the target information. In this case, the user terminal 100 may transmit the personal information to the personal information management server 200 based on the smart contract.

FIG. 5 is a diagram for describing an operation of the personal information management server according to embodiments of the present disclosure. Referring to FIG. 5, the personal information management server 200 may perform the analysis of data statistics for personal information of users based on information on a target event, and may generate target information based on the results of the execution.

The personal information management server 200 according to embodiments of the present disclosure may receive information on the target event (e.g., "a vehicle purchase") from the request terminal 300, may determine target properties TP1 and TP2 corresponding to the target event, among properties P1 to P5 that constitute personal information of users UI1 to UI5, and may generate the target information (e.g., "a vehicle purchase prediction model") by selectively using values (a slash portion hereinafter target property values) of the target properties TP1 and TP2.

In particular, the personal information management server 200 may generate the target information by using some of all the pieces of the personal information corresponding to the target event that is required by the request terminal 300, instead of using all the pieces of the personal information of the users. For example, as illustrated in FIG. 5, the personal information UI1 to UI5 that are managed by the personal information management server 200 may include the five properties P1 to P5.

In this case, the personal information management server 200 may generate the target information by using the target property values of the target properties TP1 and TP2 corresponding to the target event "vehicle purchase", among the properties P1 to P5. For example, the personal information management server 200 may generate vehicle purchase prediction information, that is, the target information for the target event "vehicle purchase", by using the target property values of the personal information of the users.

FIG. 6 is a diagram for describing an operation of the personal information management system according to embodiments of the present disclosure. Referring to FIG. 6, the request terminal 300 may request target information of a target event from the personal information management server 200 (S210). According to embodiments, the request terminal 300 may transmit, to the personal information management server 200, a request for the target information including a keyword associated with the target event. In this case, the keyword associated with the target event may include an object keyword for an object of the target event and an operation keyword for an operation of the target event. For example, if the target event is "a vehicle purchase", the request terminal 300 may transmit, to the personal information management server 200, a request for target information including an object keyword "vehicle" and a keyword of an operation keyword "purchase".

According to embodiments, the target keyword may be input by a requester who uses the request terminal 300 or may be generated by the request terminal 300 and transmitted to the personal information management server 200.

The personal information management server 200 may determine target property corresponding to the target event, among the properties of personal information (S220). According to embodiments, the personal information management server 200 may store information (e.g., a list) on possible properties of personal information of a user. In this case, the information on the possible properties of the personal information may be information that is input by a manager and stored or that is extracted from the personal information and stored. For example, the possible properties of the personal information may include "gender," "an age," "residence," "a job," "a bank account balance," "a search history", etc.

According to embodiments, the personal information management server 200 may determine the target properties based on an input from the request terminal or by using a table (e.g., a look-up table (LUT)) including information on the target properties corresponding to the target event.

The personal information management server 200 may transmit a personal information collection request to collect the collection of personal information corresponding to the determined target properties (S230). The personal information collection request may include a usage permission range, including the target properties of the personal information that is a collection target, a collection period, a usage range, etc.

The personal information collection request from the personal information management server 200 may be transmitted to the user terminal 100.

According to embodiments, the personal information management server 200 may generate a requisition form for the personal information collection request for collecting the personal information corresponding to the target property. The generated requisition form may be transmitted to the user terminal 100. In this case, the requisition form may include the usage permission range for the personal information, that is, the collection target. For example, the requisition form may be a smart contract.

The personal information management server 200 may transmit the generated requisition form to the user terminal 100 over a network. According to embodiments, the personal information management server 200 may store the generated requisition form in a blockchain network. The user terminal 100 may read the requisition form stored in the network.

The user terminal 100 may provide the personal information corresponding to the target property to the personal information management server 200 (S240). According to embodiments, when receiving the personal information collection request of the personal information management server 200, the user terminal 100 may display the contents of the personal information collection request through a display. The user may check the collection request displayed through the display and input the approval of the collection request. In response to the approval from the user, the user terminal 100 may provide the personal information management server 200 with the personal information (i.e., a target property value of the personal information) corresponding to the target properties.

Meanwhile, the transmission of the personal information between the user terminal 100 and the personal information management server 200 may be performed by the method of transmitting the request for the personal information based on the smart contract described with reference to FIG. 3. For example, the smart contract indicative of the usage (or collection) of the personal information corresponding to the target property may be established between the user terminal and the personal information management server 200. The personal information corresponding to the target property may be transmitted to the personal information management server 200 according to the corresponding smart contract. For example, the user terminal 100 may read the requisition form, and may transmit the personal information stored in the user terminal 100 to the personal information management server 200 based on the contents of the requisition form in response to the approval input for the requisition form from the user of the user terminal 100. For example, the user terminal 100 may transmit the stored personal information to the personal information management server 200 by executing codes included in the smart contract in response to the approval of the user.

Meanwhile, the personal information management server 200 may award compensation to the user who has provided the personal information. According to embodiments, the personal information management server 200 may award compensation to the user through the user terminal 100 from which the personal information has been transmitted. For example, the personal information management server 200 may transmit a message capable of receiving the compensation to the user terminal 100 or may award the compensation to an account or card of the user corresponding to the user terminal 100. However, embodiments of the present disclosure are not limited to a detailed method of awarding compensation.

In this case, the personal information management server 200 may award the compensation for each target property, and may differentially award the compensation for each target property. For example, the personal information management server 100 may set first compensation corresponding to a first target property to be higher than second compensation corresponding to a second target property.

According to embodiments, the user terminal 100 may provide the personal information management server 200 with a portion (i.e., a target property value) corresponding to target properties, among the properties of the personal information of the user, not all the pieces of stored personal information of the user. Accordingly, there are effects in that the user can minimize a danger that all of pieces of his or her personal information will be exposed and can provide only personal information that is desired to be provided by the user and the personal information management server 200 can be provided with only personal information that is necessary to generate target information.

The personal information management server 200 may generate target information by using the provided personal information corresponding to the target property (S250). According to embodiments, the personal information management server 200 may generate the target information by using target property values of personal information of users, which are provided by a plurality of user terminals.

The personal information management server 200 may generate, as the target information, a prediction model for calculating the probability that the target event will occur by using property values corresponding to the target properties. The prediction model is generated based on the provided personal information of the user, and is a model capable of calculating the probability that the target event will occur with respect to personal information of an arbitrary user.

According to embodiments, the personal information management server 200 may generate the prediction model for calculating the probability that the target event will occur by selecting at least one learning model and inputting personal information corresponding to the target property to the at least one learning model as learning data. In this case, a value corresponding to some of the target properties may be input as a problem, among the learning data, and a value corresponding to the remainder of the target properties may be input as a correct answer, among the learning data. Thereafter, property values of target properties corresponding to an arbitrary user may be input to the trained prediction model. The trained prediction model may calculate the probability that a target event will occur with respect to the arbitrary user. For example, if a target event is "a vehicle purchase", a first target property is "a vehicle holding period", and a second target property is "deposits", a property value of the first target property may be input as a correct answer, and a property value of the second target property may be input as a problem. Thereafter, when the deposits of the arbitrary user are input to the prediction model, the prediction model may calculate a vehicle purchase probability corresponding to the corresponding deposits.

Or, alternatively, the personal information management server 200 may generate the probability that the target event will occur as the target information with respect to each of users who have provided the personal information by using the property values corresponding to the target properties. For example, the personal information management server 200 may calculate a prior probability from the provided property values of the target properties, and may calculate the probability that the target event will occur as a posterior probability from the calculated prior probability. That is, the personal information management server 200 may calculate the probability that the target event will occur based on the provided property values of the target properties according to Bayesian inference.

Additionally, the personal information management server 200 may determine a user in which the probability that the target event will occur is a reference value or more, among the users who have provided the personal information.

Or, alternatively, the personal information management server 200 may generate association between each target property and the occurrence of the target event as the target information by using the property values corresponding to the target properties. According to embodiments, the personal information management server 200 may calculate the association between each of the target properties and the occurrence of the target event by analyzing correlation between the occurrence of the target event and each of the target properties based on the provided target property values of the users. For example, if a target event is "a vehicle purchase", a first target property is "a vehicle holding period", and a second target property is "deposits", the personal information management server 200 may analyze correlation between each of "the vehicle holding period" and "the deposits" and the probability that "the vehicle purchase" will occur, and may determine a target property having the greatest association (most dominant) with the occurrence of "the vehicle purchase". In this case, it may be analyzed that "the vehicle holding period" has relatively higher association with the occurrence of "the vehicle purchase" than "the deposits".

The personal information management server 200 may transmit, to the request terminal 300, information on a target property having the greatest association with the occurrence of the target event.

FIG. 7 is a diagram for describing that target properties according to embodiments of the present disclosure are determined. Referring to FIG. 7, personal information of a user may include a plurality of properties P1 to P9. Each of the properties illustrates an item of the personal information. Assuming that personal information of users is stored in the form of a table, one piece of personal information of the user may be stored as one row. In this case, each of the properties may denote a column of a corresponding row.

The personal information management server 200 according to embodiments of the present disclosure may generate target information corresponding to a target event by using target properties TP1 and TP2 corresponding to the target event, among the plurality of properties P1 to P9 of the personal information.

The personal information management server 200 may determine the target properties TP1 and TP2 based on keywords OK and AK associated with the target event. According to embodiments, the personal information management server 200 may determine properties having high similarity with the keywords OK and AK associated with the target event, among possible properties of the personal information, as the target properties.

The personal information management server 200 may determine an object target property TP1 corresponding to an object keyword OK indicative of an object of the target event and an operation target property TP2 corresponding to an operation keyword AK indicative of an operation of the target event. In this case, the object target property TP1 and the operation target property TP2 may be determined based on an input (e.g., an input from the request terminal 300) from the outside or may be determined according to a pre-designated rule.

For example, as illustrated in FIG. 7, the personal information management server 200 determines the keywords OK and AK for the target event. The personal information management server 200 may determine "a vehicle holding period" P3, "the type of vehicle" P4, and "the number of vehicles held" P5, as the object target property TP1 corresponding to the object keyword OK "vehicle". Likewise, the personal information management server 200 may determine "deposits" P7, "the amount of loans" P8, and "a credit card bill" P9, as the operation target property TP2 corresponding to the operation keyword AK "purchase".

Thereafter, the personal information management server 200 may transmit a request or a requisition form for the collection of personal information corresponding to the determined target properties TP1 and TP2.

The personal information management server 200 according to embodiments of the present disclosure may generate target information for predicting the occurrence of a target event by using personal information of users. In particular, the personal information management server 200 may determine an object keyword and an operation keyword associated with the target event, may determine target properties of the personal information corresponding to each of the object keyword and the operation keyword, and may generate target information based on the personal information of the target properties. Accordingly, there are effects in that the occurrence of a target event can be predicted more accurately and concerns about the leakage of personal information can be minimized.

FIG. 8 is a diagram for describing an operation of the personal information management system according to embodiments of the present disclosure.

Referring to FIG. 8, the user terminal 100 may perform information protection processing on personal information, and may provide the information protection-processed personal information. Accordingly, a danger that personal information of a user will leak can be reduced. Steps S210, S220, and S230 that have already been described with reference to FIG. 6, among the steps illustrated in FIG. 8, are assigned the same reference numerals, and descriptions thereof are omitted.

The user terminal 100 may perform information protection processing on personal information corresponding to target properties, and may provide the personal information to the personal information management server 200 (S241). According to embodiments, the information protection processing may be performed by changing the personal information of the user according to a predetermined probability. This is described later.

The personal information management server 200 may receive personal information corresponding to information protection-processed target information, and may interpret the corresponding information protection processing (S251). According to embodiments, the personal information management server 200 may derive candidates having an original target property value prior to the information protection processing and the possibility (probability) of the candidates from information protection-processed target property values by stochastically interpreting the target property values, that is, property values of the information protection-processed target information. The personal information management server 200 may store, as the original target property value, a candidate having the highest possibility by using the candidates having the original target property value and the possibility.

The personal information management server 200 may generate target information based on the results of the interpretation of the personal information corresponding to the information protection-processed target information (S253). According to embodiments, the personal information management server 200 may generate the target information by using the original target property value derived from the information protection-processed target property values of the users. The process of generating the target information is the same as the process of generating the target information, which has been described with reference to FIG. 6, and a description thereof is omitted hereinafter.

FIG. 9 is a diagram for describing an information protection processing process according to embodiments of the present disclosure. Referring to FIG. 9, information protection processing may be performed on personal information of a user. According to embodiments, the user terminal 100 may read personal information corresponding to a collection request from the memory 220, may perform information protection processing on the read personal information, and may store the protection-processed personal information in the memory 220 again. The information protection-processed personal information may be provided to the outside (e.g., the personal information management server 200).

The information protection processing may be performed based on a predetermined probability. Referring to FIG. 9 as an example, the personal information of the user may be changed into another value according to a pre-designated probability P. For example, when the designated probability P is 0.9, information protection processing may be performed by changing a value "00" of the vehicle holding period of a user into the probability 0.9.

The information protection-processed personal information may be used without any change or may be used after the protection processing is released. In this case, according to embodiments, if information protection processing is performed based on the designated probability P, the information protection processing may be released by using information on the corresponding designated probability P.

According to embodiments of the present disclosure, there is an effect in that concerns about the leakage of personal information can be further reduced by performing information protection processing on personal information of a user.

The above description is merely a description of the technical spirit of the present disclosure, and those skilled in the art may change and modify the present disclosure in various ways without departing from the essential characteristic of the present disclosure. Accordingly, the embodiments described in the present disclosure should not be construed as limiting the technical spirit of the present disclosure, but should be construed as describing the technical spirit of the present disclosure. The technical spirit of the present disclosure is not restricted by the embodiments. The range of protection of the present disclosure should be construed based on the following claims, and all of technical spirits within an equivalent range of the present disclosure should be construed as being included in the scope of rights of the present disc.

The aforementioned device (unit) may be implemented as a hardware component and/or a software component. For example, the hardware component may include a microphone, an amplifier, a bandpass filter, an A/D converter, and a processing device. The processing device may be implemented by using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor, or other devices capable of responding to an instruction and executing an instruction in a defined manner, for example. The processing device may operate an operating system (OS) and one or more software applications that operate on the OS. Furthermore, the processing device may access, store, manipulate, process, and generate data in response to the execution of software. For a brief description, the processing device may be described as being one, but a person having ordinary knowledge in the art may understand that the processing device may include a plurality of processing elements and/or a plurality of types of processing elements. For example, the processing device may include a plurality of processors or processors and controllers. Furthermore, other processing configurations, such as a parallel processor, are also possible.

Software may include a computer program, a code, an instruction, or a combination thereof, and may configure the processing device independently or collectively so that the processing device operates as desired or may instruct the processing device. Software and data may be embodied in the form of a propagated signal wave which may be interpreted by the processing device or may provide an instruction or data to the processing device or in various types of machines, a component, a physical device, virtual equipment, or a computer storage medium or device permanently or temporarily. The software may be distributed to computer systems connected over a network and may be stored or executed in a distributed manner. The software and data may be stored in one or more computer-readable recording media. The computer-readable recording media include a data storage device which stores data that may be subsequently read by a computer system or a processing device. The method according to the embodiment may be implemented in the form of a program instruction which may be performed through various computer means, and may be recorded on a computer-readable medium. Examples of the computer-readable recording medium include ROM, RAM, CD-ROM, a magnetic tape, a floppy disk, and an optical data storage device, and include magnetic media such as a hard disk, a floppy disk, and a magnetic tape, optical media such as CD-ROM and a DVD, magneto-optical media such as a floptical disk, and hardware devices specially configured to store and execute program instructions, such as ROM, RAM, and flash memory. Furthermore, a functional program, a code, and code segments that complete the examples disclosed herein may be easily understood and implemented by a programmer having ordinary knowledge in the technical field related to these examples based on the description provided herein or by using the description in relation to the flowcharts of the drawings and the block diagrams.

Although the terminal or the device described herein may not be generally applied, the terminal or the device may be applied to mobile devices, such as a cellular telephone, a PDA, a digital camera, a portable game console, an MP3 player, a portable/individual multimedia player (PMP), a portable e-book, a portable laptop PC, GPS navigation, a tablet, and a sensor, and a desktop PC, HDTV, an optical disk player, a set-top box, home appliances, and devices capable of wireless communication or network communication.

Furthermore, the computer-readable medium may include a program instruction, a data file, and a data structure alone or in combination. The program instruction recorded on the medium may be specially designed and constructed for the embodiments or may be known and available to those skilled in the computer software field. Examples of the program instruction include not only a machine code produced by a compiler, but a high-level language code capable of being executed by a computer through an interpreter, etc. The hardware device may be constructed as one or more software modules in order to perform an operation of the embodiment, and vice versa.

As described above, although several embodiments have been described, it is to be understood that the present disclosure may be modified in various ways. For example, proper results may be achieved although the above descriptions are performed in order different from that of the described method and/or the aforementioned components, such as the system, structure, device or apparatus, and circuit, are combined in a form different from that of the described method or replaced with or supplemented by other components or equivalents. Accordingly, other implementations of the claims fall within the scope of the claims.

The invention claimed is:

1. A personal information management server configured to manage personal information of a user, the personal information management server comprising:
 a communication circuit configured to exchange data with an external device;

memory configured to store data necessary for an operation of the management server; and a processor configured to perform a plurality of operations in response to an execution of instructions stored in the memory, wherein the plurality of operations being performed by the processor comprises:

receiving target event information from a request terminal, determining a target property associated with the target event, among properties of the personal information, transmitting a personal information collection request for collecting personal information corresponding to the target property from a user terminal that stores the personal information, wherein the personal information collection request includes a usage permission condition defined by a smart contract;

receiving the personal information corresponding to the target property from the user terminal in response to user consent based on the smart contract, wherein the personal information has been selectively de-identified based on a de-identification level set by the user terminal;

generating target information for predicting an occurrence of the target event by using the personal information corresponding to the target property, and transmitting the target information to the request terminal.

2. The personal information management server of claim 1, wherein the receiving of the target event information comprises receiving a keyword related to the target event.

3. The personal information management server of claim 1, wherein the determining of the target property comprises selecting a property corresponding to the target event, among possible properties of the personal information, as the target property with reference to a list of previously stored properties of the personal information.

4. The personal information management server of claim 3, wherein the determining of the target property further comprises selecting a property corresponding to a keyword related to the target event, among the possible properties of the personal information, as the target property.

5. The personal information management server of claim 4, wherein the determining of the target property further comprises determining the target property with reference to relation data that stores the keyword related to the target event and a target property corresponding to the keyword related to the target event.

6. The personal information management server of claim 4, wherein:

the keyword associated with the target event comprises an object keyword related to an object of the target event and an operation keyword related to an operation of the target event, and the determining of the target property further comprises determining an object target property corresponding to the object keyword and an operation target property having high association with the operation keyword, among the properties of the personal information, as the target property.

7. The personal information management server of claim 1, wherein the transmitting of the collection request comprises:

generating a smart contract having personal information corresponding to the target property, among the personal information of the user, as a permission range; and recording the smart contract on a blockchain network.

8. The personal information management server of claim 1, wherein the target information is a learning-based prediction model that outputs a probability that the target event is to occur when the personal information of the user is input.

9. The personal information management server of claim 8, wherein the generating of the target information comprises:

determining a learning model corresponding to the target property, and generating the target information by inputting the personal information corresponding to the target property to the learning model as learning data.

10. An operating method of a personal information management server configured to manage personal information of a user, the operating method comprising:

receiving target event information from a request terminal;

determining a target property associated with the target event, among properties of the personal information;

transmitting a personal information collection request for collecting personal information corresponding to the target property from a user terminal that stores the personal information, wherein the personal information collection request includes a usage permission condition defined by a smart contract;

receiving the personal information corresponding to the target property from the user terminal in response to user consent based on the smart contract, wherein the personal information has been selectively de-identified based on a de-identification level set by the user terminal;

generating target information for predicting an occurrence of the target event by using the personal information corresponding to the target property; and transmitting the target information to the request terminal.

11. The operating method of claim 10, wherein the determining of the target property comprises selecting a property corresponding to the target event, among possible properties of the personal information, as the target property with reference to a list of previously stored properties of the personal information.

12. The operating method of claim 11, wherein the determining of the target property further comprises selecting a property corresponding to a keyword related to the target event, among the possible properties of the personal information, as the target property.

13. The operating method of claim 12, wherein the determining of the target property further comprises determining the target property with reference to relation data that stores the keyword related to the target event and a target property corresponding to the keyword related to the target event.

14. The operating method of claim 10, wherein the transmitting of the personal information collection request comprises:

generating a smart contract having personal information corresponding to the target property, among the personal information of the user, as a permission range; and recording the smart contract on a blockchain network.

15. The operating method of claim 10, wherein the target information is a learning-based prediction model that outputs a probability that the target event is to occur to the user by using the personal information of the user as an input.

* * * * *